(12) United States Patent
Krüger et al.

(10) Patent No.: US 11,557,111 B2
(45) Date of Patent: Jan. 17, 2023

(54) METHOD FOR DETERMINING THE START OF RELAXATION AFTER A BURN-IN PROCESS AT OPTICAL DISPLAY DEVICES CONTROLLABLE PIXEL BY PIXEL

(71) Applicant: TechnoTeam Holding GmbH, Ilmenau (DE)

(72) Inventors: Udo Krüger, Werra-Suhl-Tal (DE); Ingo Rotscholl, Darmstadt (DE); Ralf Poschmann, Plaue (DE); Tobias Porsch, Erfurt (DE)

(73) Assignee: TechnoTeam Holding GmbH, Ilmenau (DE)

( * ) Notice: Subject to any disclaimer, the term of this patent is extended or adjusted under 35 U.S.C. 154(b) by 42 days.

(21) Appl. No.: 17/342,384

(22) Filed: Jun. 8, 2021

(65) Prior Publication Data

US 2021/0383155 A1 Dec. 9, 2021

(30) Foreign Application Priority Data

Jun. 9, 2020 (DE) ...................... 10 2020 207 184.5

(51) Int. Cl.
*G09G 3/20* (2006.01)
*H04N 17/02* (2006.01)
(Continued)

(52) U.S. Cl.
CPC .............. *G06V 10/60* (2022.01); *G06V 10/10* (2022.01); *G06V 10/56* (2022.01); *G09G 3/20* (2013.01); *H04N 17/02* (2013.01)

(58) Field of Classification Search
CPC ........ G06V 10/60; G06V 10/56; G06V 10/10; G09G 5/00; G09G 3/20; G09G 3/3225; H04N 17/00; H04N 17/02
(Continued)

(56) References Cited

U.S. PATENT DOCUMENTS 7,619,596 B2 * 11/2009 Tada .................... G09G 3/3241
345/82
10,930,211 B2 * 2/2021 Koh ...................... G09G 3/3406
(Continued)

FOREIGN PATENT DOCUMENTS

CN 106784344 6 1/2019
CN 110376218 A 10/2019
(Continued)

OTHER PUBLICATIONS

Germany Office Action, dated Jan. 14, 2021 for corresponding German Application No. DE 10 2020 207 184.5 with English translation (10 pages).
(Continued)

*Primary Examiner* — Trang U Tran
(74) *Attorney, Agent, or Firm* — Intellectual Property Law Group LLP

(57) ABSTRACT

The invention relates to a method for determining a start of relaxation ($t_R$) when switching over an optical display device (1) controllable pixel by pixel from a burn-in image (EB') to a relaxation image (RB), wherein. A trigger image area (TB) having at least one image pixel is set to pixel values such that a parameter determined based on the at least one pixel value across the trigger image area (TB) differs between the burn-in image (EB') and the relaxation image (RB). The local distribution of a greyscale value is continuously recorded by means of a camera (3, 13). A trigger subfield (20) comprising at least one sensor pixel (15) is defined matching the trigger image area (TB). A trigger parameter (T) is continuously determined from the pixel values of the at least one sensor pixel (15) in the trigger subfield (20) with a trigger clock rate and the start of relaxation ($t_R$) is determined as the point in time at which the continuously determined trigger parameter (T) crosses the trigger threshold value ($T_S$). The invention furthermore
(Continued)

relates to a device and a method for determining the burn-in behavior of a display device (1) as well as the use of such a method for a display (1) determined for application in a vehicle.

15 Claims, 5 Drawing Sheets

(51) Int. Cl.
  *G06V 10/60*  (2022.01)
  *G06V 10/10*  (2022.01)
  *G06V 10/56*  (2022.01)

(58) Field of Classification Search
  USPC .................................. 345/207, 690; 348/191
  See application file for complete search history.

(56) References Cited

U.S. PATENT DOCUMENTS

| | | | |
|---|---|---|---|
| 11,276,369 B2* | 3/2022 | Jung | ........................ G09G 3/20 |
| 2002/0047982 A1* | 4/2002 | Sonoda | ............. G02F 1/133345 349/177 |
| 2003/0214586 A1 | 11/2003 | Lee et al. | |
| 2007/0222860 A1 | 9/2007 | Katayama et al. | |
| 2017/0004753 A1* | 1/2017 | Kim | ...................... G09G 3/3233 |
| 2018/0075798 A1 | 3/2018 | Nho et al. | |

FOREIGN PATENT DOCUMENTS

| | | |
|---|---|---|
| TW | 200627346 A | 8/2006 |
| TW | I571855 B | 2/2017 |

OTHER PUBLICATIONS

Rotscholl, Ingo; Krüger, Udo: Aspects of image sticking evaluations using imaging luminance measurement devices. In: SID International Symposium Digest of Technical Papers, Bd. 50, 2019, H. 1, S. 695-698 (4 pages).

Lee, Don-Gyou et al., "P-24: The Analysis Method of Dynamic Characteristics in LCD", SID Symposium Digest of Technical Papers, 2003, p. 292-295 (4 pages).

European Search Report dated Oct. 29, 2021 for corresponding European application No. 21 17 4923 with English translation (14 pages).

Taiwan Office Action, dated Dec. 1, 2021 for corresponding Taiwan Application No. 110119859 with English translation (6 pages).

* cited by examiner

METHOD FOR DETERMINING THE START OF RELAXATION AFTER A BURN-IN PROCESS AT OPTICAL DISPLAY DEVICES CONTROLLABLE PIXEL BY PIXEL

CROSS-REFERENCE TO RELATED APPLICATION

This application claims priority to German patent application no. 10 2020 207 184.5 filed on Jun. 9, 2020, which is hereby incorporated by reference in its entirety.

BACKGROUND

1. Field of Invention

The invention relates to a method for determining the start of relaxation after at an optical display device controllable pixel by pixel having been subjected to a burn-in process. Moreover, the invention relates to a method and a device for determining the burn-in behavior at such a display device as well as to the use of such a method for determining the burn-in behavior of displays applied in vehicles.

2. Background Art

Optical display devices electronically controllable pixel by pixel, in particular displays, may show changes of a presented image referred to as burn-in. Burn-in may be caused by prolonged invariant presentation of an image on the display device. If, immediately after having presented such a burned-in image, the display device is controlled to present a display image modified relative to the burned-in image, the presented image may show features and structures of the previously presented burn-in image. Such burn-in effects are also referred to as ghost image, image sticking, image retention or burn-in.

After burn in, the display image appears modified relative to a presentation of the same display image on a display device not having been subjected to burn in, wherein the difference may decrease with the duration of the presentation of the display image. In many cases, the development of the interference $S(t)$ caused by burn in over time may be approximated by a decaying exponential function $S(t)=S_0 \cdot e^{-t/\tau}$. The interference $S_0$ observed immediately after switching over the display device from the burn-in image to the display image may for example be related to a reference image B0 via a scalar factor $\alpha$, i.e.: $S_0=(1+\alpha) \cdot B0$. The time constant r of the exponentially decaying interference is referred to as a relaxation time constant.

The interference caused by the burn in may relate to the luminance density and/or color of the presented image, depending on the technology of the display device. Burn-in behavior is known from displays, in particular LCD (liquid crystal display) and OLED (organic light emitting diode) displays. Likewise, displays and projecting display devices based on DMD (digital mirror device) technology are known to show burn-in behavior. Likewise, other displays and projecting display devices working by other physical principles may be affected by such burn-in behavior.

It is also possible that the interference caused by burn-in does not decay completely, in particular after a very long subjection to a burn-in image over many hours or weeks.

Methods for determining the burn-in behavior known in the art control a display device to present a test image and chart the luminance distribution emitted by the display device. Subsequently, the display device is controlled to present a burn-in image for a predetermined time, e.g. a couple of minutes, hours or even several days to provoke burn in Immediately after, the display device is again controlled to present the test image and the luminance density distribution differing from the originally (prior to burn in) charted luminance density distribution under the burn in effect, is charted.

Devices and methods for scanning (i.e. sampling point by point) charting as well as for planar charting of a luminance density distribution are known. In particular, luminance density distribution measurement cameras are known which allow for charting the local distribution of a photometric characteristic, e.g. a luminance density emitted by the display device.

The difference in luminance density distributions may be detected as a quotient or as a difference. Likewise, a plurality of differences may be detected by charting a course of the presentation of the test image emitted by the display after the burn-in process with regard to the luminance density distribution over time.

For a quantitative determination of the burn in effect as well as the relaxation of a display device (i.e.: the decay of the interference of the presentation caused by the burn in) it is required to relate the time of the measurement of the luminance density distribution to the point in time at which the burn-in image was switched off and the test image was switched on, which in the following shall be referred to as the start of relaxation.

There are methods known in which the measurement of the luminance density distribution occurs by recording a camera image of a luminance density measurement camera with a time offset to controlling the display device to present the test image. For example, the control of the display device from presenting the burn-in image to presenting the test image may firstly be switched by a computer via a graphic output, and then, after a predetermined waiting time, the recording of the camera image may be triggered at the luminance density measurement camera.

It is also known that the switchover of the image presented by the display device is not synchronous to the switchover from the burn-in image to the test image, but delayed in relation thereto. The delay depends inter alia from the technology of the display device and from the type of graphic output used by the computer for controlling the display device. Typically, this delay is not precisely known or may only be determined with additional effort. This delay may be variable such that a plurality of measurements may yield different values for the delay.

It is likewise possible that the switchover from the burn-in image to the test image does not occur synchronously for all image pixels such that some pixels already present the pixel value assigned to the test image while other image pixels still present the pixel value assigned to the burn-in image.

Moreover, the point in time, at which a recording may be triggered at a luminance density measurement camera, is generally not synchronous to the switchover of the presented image but subject to a fluctuating deviation (jitter).

In order to quantify the burn-in effect it is advantageous to record at least one luminance density distribution immediately after switching over the image actually displayed by the display device.

Because of the switchover delay which is not exactly known and because of the jitter there is the risk on the one hand to trigger a recording of a camera image at the luminance density measurement camera already prior to switching over the presented burn-in image to the test image. In this case, exposure of the luminance density measurement camera occurs with the burn-in image at least over part of the exposure time. This way, the burn in effect will be overestimated.

On the other hand, there is the risk for late triggering of the luminance density measurement camera relative to the switchover of the display device. In this case, a luminance density distribution of the display device is recorded in an already partially relaxed state. This way, the burn in effect will be underestimated.

From the publication Rotscholl, Ingo; Krüger, Udo (2019): 50-3: Aspects of Image Sticking Evaluations Using Imaging Luminance Measurement Devices. In: SID Symposium Digest of Technical Papers 50 (1), S. 695-698. DOI: 10.1002/sdtp.13014, a method and a device are known in which a photometric characteristic is recorded at a display by means of an external measurement device independent from a luminance density measurement camera. If the image presented by the display varies, e.g. when switching over from a burn-in image to a test image, then the photometric characteristic detected by the external measurement device also varies. The start of relaxation, i.e. the switchover from the presentation of the burn-in image to the presentation of the test image, may be more precisely determined by comparing the measured photometric characteristic with a predetermined threshold, in particular determined based on the burn-in image, the test image, the display section recorded by the external measurement device, and the integration time for the measurement. This way it is possible to more precisely trigger the recording of a luminance density distribution relative to the recovery time or relaxation time of the charted display or to computationally relate them more precisely, e.g. to determine a relaxation time constant.

SUMMARY

The object of the invention is to provide an improved method for determining the start of relaxation at an optical display device controllable pixel by pixel, which has been subjected to a burn-in process.

Another object of the invention is to provide a method for determining the burn-in behavior of an optical display device controllable pixel by pixel.

Another object of the invention is to provide a device for determining the burn-in behavior of an optical display device controllable pixel by pixel.

Another object of the invention is to provide a use for the method for determining the burn-in behavior of an optical display device controllable pixel by pixel.

According to the invention, in a method for determining a start of relaxation of a relaxation starting after switching over an optical display device controllable pixel by pixel from a burn-in image to a relaxation image different from the burn-in image, a trigger image area within the burn-in image and comprising at least one image pixel is set to pixel values such that a first parameter formed from the at least one pixel value in the trigger image area of the burn-in image differs from a second parameter formed from the at least one pixel value in the trigger image area of the relaxation image.

For example, the first and the second parameter may be determined as the sum or average of a plurality of pixel values of the trigger image area in the burn-in image or in the relaxation image, respectively.

The trigger image area may also comprise multiple image pixels. The image pixels assigned to the trigger image area may then be arranged contiguously. However, it is also possible to merge several non-contiguous trigger image subareas in a trigger image area, wherein the image pixels of these trigger image subareas are then set to pixel values such that a sum over all trigger image subareas or an average of pixel values over all trigger image subareas differs from the sum or from the average, respectively, of the pixel values of the image pixels arranged corresponding to the trigger image subareas in the relaxation image.

The burn-in image and the relaxation image are equal in size, i.e.: they have the same pixel sizes but differ in the pixel values. The trigger image area may for example be configured as a rectangular or square subarea. The trigger image area has the same position in the burn-in image and in the relaxation image with regard to the pixel dimensions.

The local distribution of a greyscale value is continuously recorded by a camera comprising a sensor field of sensor pixels. The camera is configured for reading out the entirety of all sensor pixels with a camera clock rate.

A trigger subfield of sensor pixels is defined such that the trigger subfield overlaps the trigger image area of a display image presented on the display device.

A trigger parameter is continuously determined from the pixel values of the sensor pixels in the trigger subfield with a trigger clock rate. The trigger parameter may for example be determined as a sum or an average of all pixel values in the trigger subfield; however, other measures, e.g. statistical measures for the determination of the trigger parameter are possible.

The course of the greyscale value covered by the sensor pixels corresponds to the course of the local distribution of a photometric characteristic, e.g. a luminance density, across the display device to the extent that a temporal change of such a photometric characteristic in the trigger image area of a display image presented on the display device causes a temporal change of a trigger parameter determined from the pixel values of the sensor pixels in the trigger subfield.

In an embodiment, the camera is a luminance density measurement camera and configured to record the local distribution of a photometric characteristic.

A trigger threshold value, which lies between the trigger parameter resulting for the recording of the burning-in image and the trigger parameter resulting for the recording of the relaxation image, is determined.

The start of relaxation is determined as the point in time at which the continuously determined trigger parameter crosses, e.g. exceeds for the first time or falls below for the first time, the trigger threshold value.

An advantage of the method is that it works independently from the latency between the control of the display device and the switchover of the presentation on the display device, which latency cannot be exactly determined. Thus, the relaxation point in time at which the relaxation of the display device from the effect of the burn-in image starts may be determined more precisely. A further advantage of the method is that, aside from the camera, no additional means are required. Moreover, latency and jitter are avoided which inevitably occur when controlling the camera by such additional means.

In an embodiment of the invention, the trigger clock rate is chosen to be as least as high as the camera clock rate envisaged for reading out the sensor pixels of the sensor field of the camera. An advantage of this embodiment is that the relaxation point in time can be determined more precisely than what would be possible by analyzing the individual images provided by the camera.

It is possible to increase the trigger clock rate relative to the camera clock rate by only reading out subareas of the sensor field in a form sufficient and suitable for determining the trigger parameter. It is for example possible to merge a plurality of neighboring sensor pixels by sensor pixel binning and to read them out as a single value corresponding to the sum or the average of all merged sensor pixels. Likewise, methods are possible, in which the sensor field of the camera is subsampled, e.g. by reading out only every other or every fourth sensor pixel, in general: every n-th sensor pixel.

Likewise, methods, in which only a subarea of the sensor field of the camera referred to as area of interest (AOI) or a plurality of such subareas are read out, are possible and result in a significant increase of the trigger clock rate.

In an embodiment of the method, only a subfield of the sensor field of the camera is being read out which comprises at least the trigger subfield. The sensor pixels assigned to the trigger subfield and thus also to the read out subfield of the sensor field may be arranged contiguously. Likewise, these sensor pixels may be non-contiguously distributed across the sensor field. The read out subfield of the sensor field may be restricted to the trigger subfield. Likewise, it may comprise further, additional sensor pixels not assigned to the trigger subfield.

In this embodiment, the trigger clock rate is chosen to be greater than the camera clock rate envisaged for completely reading out the sensor field.

Such methods allow for transmitting a lower number of values when reading out a subarea of the sensor field and thus allow for increasing the trigger clock rate relative to the camera clock rate. Thus, the relaxation time may be determined even more precisely.

For example, by means of such methods, a trigger clock rate of more than 1 kilohertz and thus a temporal resolution in the millisecond range may be achieved when determining the relaxation point in time at a camera clock rate of 20 Hertz.

In an embodiment of the method, the trigger parameter is only determined within a period of predetermined duration, comprising the point in time at which the display device is controlled to switch over from the burn-in image to the relaxation image. The switchover point in time, at which the display device is controlled to switch over from the burn-in image to the relaxation image, may be determined only imprecisely, though with low technical effort. To achieve a high precision regarding the start of relaxation, closer examination of a certain period prior to and/or after this switchover point in time is sufficient then. Thus, the effort for performing the method may be reduced.

In a further embodiment of the method, an average trigger parameter is formed from a plurality of trigger parameters recorded consecutively in a period of predetermined duration, and this average trigger parameter is compared with the trigger threshold value instead of the individual trigger parameters. The average trigger parameter may be formed by a floating average, a floating median, a low pass or a similar signal processing method for eliminating high-frequency disturbance.

This embodiment has the advantage that fluctuations of the temporally continuously determined trigger parameter are eliminated, which may be caused by the brightness modulation of the display device. For example, display devices may control the brightness of image pixels by pulse width modulation and thus generate varying trigger parameters with the same image content presented on the display device, depending on the temporal position of the integration time of the camera relative to the clock of the pulse width modulation. The proposed forming of the average trigger parameter avoids an erroneous detection of a crossing of the trigger threshold, i.e. exceeding it or falling below it.

In an embodiment of the method, the pixel values in the trigger image area are selected such that a first average of pixel values in the trigger image area of the burn-in image is greater than a second average of pixel values in the trigger image area of the relaxation image. In an embodiment, the pixel values in the trigger image area of the burn-in image are selected such that the maximum luminance density achievable with the display device is achieved in at least one subarea of the trigger image area.

This way, the integration time or exposure time, during which the trigger image area has to be exposed to obtain an analyzable trigger parameter, may be reduced. This allows for a denser temporal sequence (or sampling) of the trigger parameter. Thus, the start of relaxation may be determined more precisely.

In a method for determining the burn-in behavior of an optical display device controllable pixel by pixel, the display device is controlled to present a reference image if it has not been subjected to a burn-in process. Herein, a first camera image covering the local distribution of a greyscale value corresponding to the local distribution of a photometric characteristic across the display device is recorded by a camera while the same is controlled to present the reference image.

Then, the display device is controlled to present the burn-in image for a predetermined burn-in period.

Then, the display device is controlled to present the relaxation image. Herein, at least one further camera image covering the local distribution of a greyscale value corresponding to the local distribution of a photometric characteristic across the display device is recorded by the camera while the same is controlled to present the relaxation image.

According to the invention, a start of relaxation is determined by means of the camera according to one of the above described methods and the burn-in behavior for the display device is determined from the first camera image, the at least one further camera image and the start of relaxation.

An advantage of this method is that the start of relaxation may be determined more precisely and thus, also the relaxation behavior, e.g. the relaxation time constant, of the display device, which results from the interference related to the relaxation duration in the charted image, may be determined more precisely. A further advantage of the method is that, aside from the camera, no additional means are required. Thus, latency and jitter are also avoided which inevitably occur when controlling the camera by such additional means. Thus, a more reliable and precise assessment of the relaxation behavior of the display device may be achieved.

In an embodiment of the method for determining the burn-in behavior, only a subfield of the sensor field, i.e. only a part of all sensor pixels of the camera, is being read out from the at least one further camera image covering the local distribution of a greyscale value corresponding to the local distribution of a photometric characteristic across the display device while the same is controlled to present the relaxation image. Reading out this subfield is being performed using a read out clock rate which is higher than the camera clock rate envisaged for the complete reading out of the sensor field (i.e. for reading out all sensor pixels of the camera).

Thus, the course of the photometric parameter during the presentation of the relaxation image may be recorded with a higher temporal resolution than with a complete reading out of the at least one further camera image. Thus, the accuracy in assessing the burn-in behavior may be improved.

In an embodiment, the subfield, read out in the at least one further camera image during presentation of the relaxation image on the display device using the read out clock rate which is increased relative to the camera clock rate, at least partially overlaps the trigger subfield used for determining the trigger parameter. Thus, implementation of the method may be facilitated and the effort for establishing the relation between the subfield and the corresponding image area of the relaxation image may be reduced.

In an embodiment of the method, the camera is configured as a luminance density measurement camera allowing for a particularly precise, in particular quantitative, determination of the burn-in behavior of a display device.

In an embodiment of the method, the at least one further camera image is recorded within a predetermined temporal offset to the point in time at which the trigger parameter crosses the trigger threshold value.

For some types of display devices it is known that the switchover from a first image, e.g. the burn-in image, to a subsequent second image, e.g. the relaxation image, does not occur instantaneously at the point in time at which the new image content is transmitted to the display device. Rather, in such display devices the switchover occurs for different image pixels at different points in time distributed within a switchover interval which is typically a few milliseconds to 100 milliseconds long.

The switchover interval is known or may be determined, dependent on the type of display device.

In the present embodiment of the method, a temporal offset is added to the point in time at which the trigger parameter crosses the trigger threshold value for determining the start of relaxation, wherein the temporal offset at least covers the known or previously determined switchover interval. Thus it is ensured that all image pixels (and not only the ones of the trigger image area) show the image content of the relaxation image at the start of relaxation determined this way.

An advantage of this embodiment is that the burn-in effect may be more easily compared and assessed if camera images are recorded in a predetermined temporal distance to the start of relaxation and used for the analysis. In particular, this way it is avoided that the burn-in effect is erroneously overestimated due to the fact that an image, shown by the display device at a start of relaxation that was determined to be too early, in parts still presents the burn-in image, in particular outside the trigger image area.

A device for determining the burn-in behavior of an optical display device controllable pixel by pixel comprises a control unit and a camera. The camera is configured as a complementary metal-oxide semiconductor (CMOS) camera. In the alternative, the camera may also be configured as a charged coupled device (CCD) camera. The control unit is configured to control an optical display device controllable pixel by pixel. According to the invention, the control unit and the camera are configured to perform the above described method for determining the burn-in behavior of an optical display device controllable pixel by pixel.

The camera may be configured as an intelligent camera (smart camera) and comprise an internal processor configured for performing image processing operations and/or for performing the above described method for determining the burn-in behavior of an optical display device controllable pixel by pixel.

An advantage of this device is that the start of relaxation and thus the burn-in behavior may be determined particularly exactly and well reproducible. A further advantage is that the device-related effort and the effort for configuring and calibrating the measurement device may be reduced relative to measurement devices known in the art which apply an external measurement arrangement independent from the camera for determining the start of relaxation.

In an embodiment of the device, the camera is configured for continuously determining the trigger characteristic from the at least one pixel value of the sensor pixels in the trigger subfield and for comparing the trigger characteristic with the trigger threshold value.

An advantage of this embodiment is that the determination of the start of relaxation and a triggering of one or more camera recordings coupled thereto may be performed autarkic within the camera. Thus, the impact of latency and jitter, which inevitably occur when exchanging data between the camera and the computer, may be avoided or reduced. Thus, precision and reproducibility may be improved when determining the burn-in behavior. Moreover, the device-related effort may be reduced as external measurement arrangements are not required.

In a further aspect of the present invention, the proposed method for determining the burn-in behavior of an optical display device controllable pixel by pixel is applied for determining the burn-in behavior of a display determined for application in a vehicle.

Displays applied in vehicles are used over a particularly long service time and at a particularly high rate to present graphics or images which are static or unchanged over a long time. Thus, the exact and reliable determination of interferences caused by such static images is of particularly high importance here. Based on a more precise determination of the start of relaxation, the proposed method allows for a more reliable assessment of displays than methods known in the art.

BRIEF DESCRIPTION OF THE DRAWINGS

In the following, embodiments of the invention are described in more detail with reference to drawings.

Corresponding parts are given the same reference signs in all figures.

DETAILED DESCRIPTION OF SPECIFIC EMBODIMENTS

Figure 1:
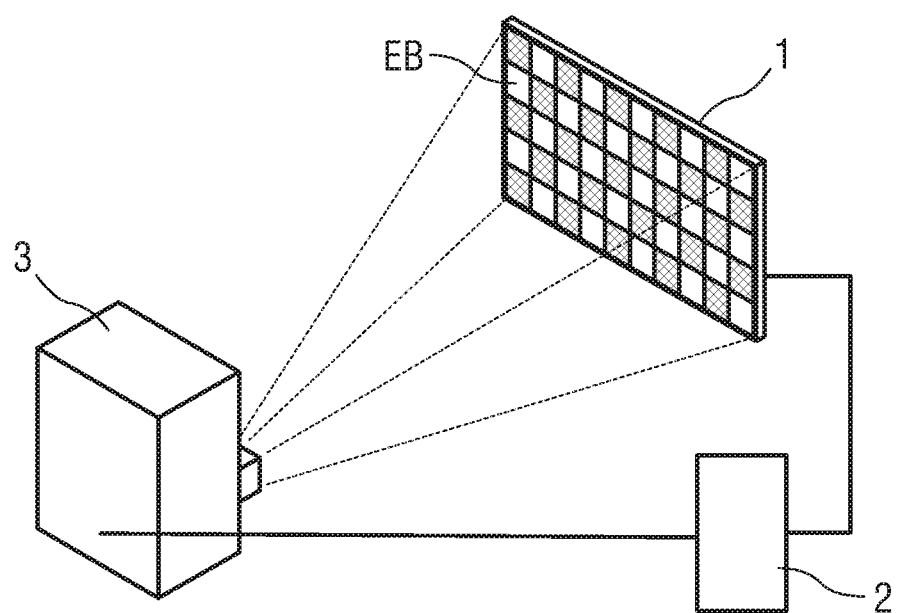
FIG. 1 is a schematic view of an arrangement for charting the burn-in behavior of a display.

FIG. 1 is a schematic view of a measurement setup known in the art for charting the burn-in behavior of a display 1. The measurement setup comprises a computer 2 connected to the display 1 and to a camera 3.

The display 1 to be charted may for example be a liquid crystal display (LCD) or an organic luminous display (OLED organic light emitting diode).

The computer 2 is configured to output images or graphics on the display 1. Instead of the computer 2, a test image generator not shown in detail may be used to output images on the display 1.

A burn-in image EB being output on the display 1 is presently illustrated. The burn-in image EG is configured as a chessboard pattern with square fields distributed across the entire image area. The square fields have an approximately homogenous luminance density, wherein adjacent fields differ from one another in luminance density. In an embodiment, the chessboard pattern consists of fields with a maximized difference in contrast.

The connection between the computer 2 or the test image generator not shown in detail and the display 1 may for example be a VGA (Video Graphics Array) connection, a HDMI (High Definition Multimedia Interface) connection, a display port connection or a DVI (Digital Visual Interface) connection. Likewise, generic bus types not limited in application to the transmission of images or graphics may be used for connecting the computer 2 or the test image generator to the display 1. For example, a Controller Area Network (CAN) bus may be used for the connection.

The camera 3 is configured for recording a camera image KB not shown in detail in FIG. 1, the camera image KB capturing the burn-in image EB presented by the display 1. The camera 3 is configured such that the luminance density emitted by the display 1 is captured pixel by pixel as a grey scale value or as a color value. In particular, the optical axis of the camera 3 is aligned perpendicular to the display 1. Moreover, the camera 3 is configured to provide photometric or colorimetric pixel values for a plurality of image pixels.

The computer 2 is configured to receive and process a camera image KB recorded by the camera 3.

Figure 2:
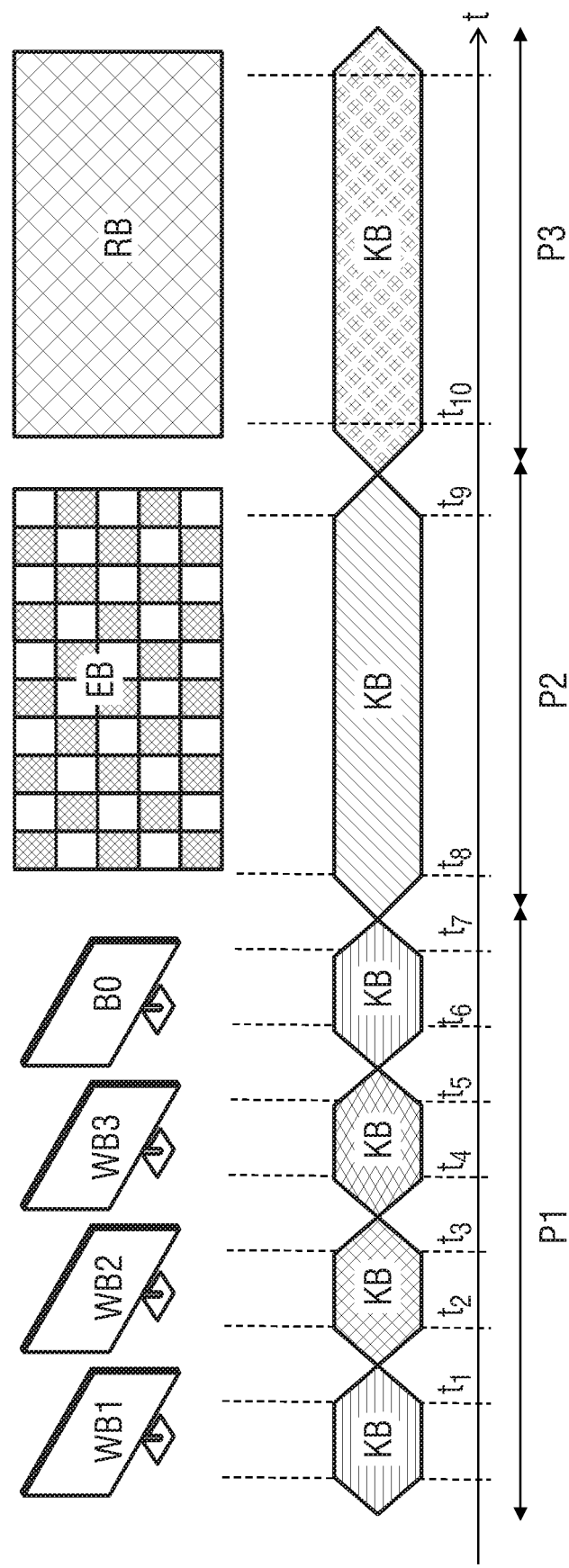
FIG. 2 is a schematic view of a sequence of images projected when charting the burn-in behavior.

FIG. 2 is a schematic view of a sequence of images presented on the display 1 when charting the burn-in behavior according to the prior art. The process is divided into three phases P1, P2, P3.

In a first phase P1 the display 1 is controlled by the computer 2 with a rolling sequence of warming-up images WB1 to WB3. The warming-up images WB1 to WB3 have an approximately homogenous grey scale value distribution with grey scales different from one another. The warming-up images WB1 to WB3 are configured such that the display 1 arrives at a stationary operating state and that no burn-in effects are caused on the display 1. The sequence of warming-up images WB1 to WB3 is only shown once in FIG. 2, however, it may be repeated in a cycle if required to arrive at a stationary operating state.

At the end of the first phase P1 the display 1 is fed a reference image B0 having a homogenous grey scale reference value.

In a second phase P2 following the first phase P1 the display 1 is fed the burn-in image EB described above with reference to FIG. 1.

In a third phase P3 following the second phase P2, the display 1 is fed a relaxation image RB. In an embodiment, the relaxation image RB is identical to the reference image B0.

At least one camera image KB(DB) is recorded by the camera for each display image DB presented on the display 1. A burn-in effect, in particular a relaxation time constant r may be determined by comparing the camera image KB(B0) pertaining to the reference image B0 with the camera image KB(RB) pertaining to the relaxation image RB.

For an accurate determination of the burn-in effect it is advantageous to know the time difference between the presentation of the relaxation image RB on the display 1 and the recording of the related camera image KB(RB) as precisely as possible.

The control of the display 1 by the computer, i.e.: Output of a respectively different image via the connection between the computer 2 and the display 1, occurs at control points in time $t_1, t_3, \ldots t_9$.

Due to the signal transfer from the computer 2 to the display 1, due to the latency of the display 1, and due to the exposure time of the camera 3 which is typically a few hundredths to tenths of a second, and the clock for reading out the camera images KB being offset relative to the pulsing of the display images DB, the display images DB provided by the computer 2 appear in the camera 3 as camera images KB with a delay at switchover times $t_2, t_4, \ldots t_{10}$.

The latency $\Delta t_{i,i+1} = t_{i+1} - t_i$, $i = 1, 3, 5, 7, 9$ between the switch over of the display image DB by the computer 2 and the point in time of recording the camera image KB pertaining to new display image DB can thus not be exactly determined with methods known in the art. This also affects the accuracy in determining the burn-in effect.

The present invention has recognized and overcome this detriment as will be explained in the following with reference to the measurement setup shown in FIG. 3 which is modified relative to FIG. 1.

The measurement setup comprises a modified camera 13 and a modified computer 12. The computer 12 is configured to present a modified burn-in image EB' on the display 1. The modified burn-in image EB' comprises a trigger image area TB with a homogenous grey scale distribution. In an embodiment, the trigger image area TB covers a plurality of fields of the chessboard pattern and has a grey scale value differing from the average grey scale value of the burn-in image EB' as well as from the average grey scale image of the relaxation image RB as much as possible. For example, the trigger image area TB may have the maximum (brightest) grey scale value presentable by the display 1.

The modified camera 13 is configured to read in and/or process a predetermined partial area of a camera image KB. In particular, the modified camera 13 is configured to read in this partial area with a higher speed and a higher frequency than the complete camera image KB. Thus, changes in the predetermined partial area captured by the camera image KB may be detected particularly fast.

Figure 4:
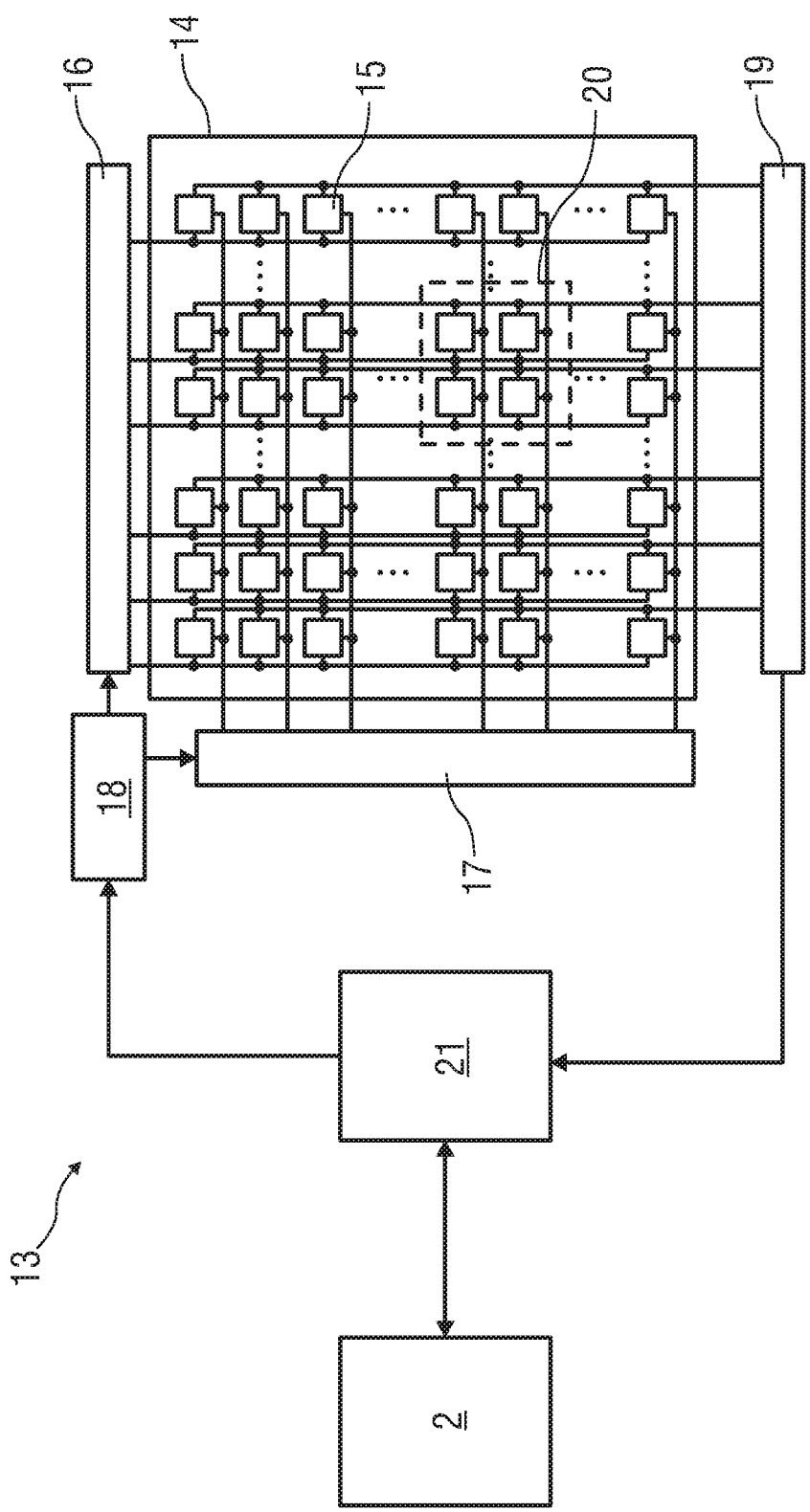
FIG. 4 is a schematic view of a sensor field of a CMOS camera.

In an embodiment shown in FIG. 4 the camera 13 is configured as a CMOS (complementary metal-oxide-semiconductor) camera and comprises a sensor field 14 having a plurality of light sensitive sensor pixels 15 arranged in a matrix-like fashion. The digitalized measures of the sensor field 14 form the camera image KB.

By means of a column address decoder 16 and a row address decoder 17, a sensor pixel 15 whose address matches an address predetermined by an address generator 18, is selected to be output. The selected sensor pixel 15 is made available in a read-out register 19 as a digital value. In the same way, a range of sensor pixels 15 in a row of the sensor field 14 may be made available as a plurality of digital values in the read-out register 19.

Thus, it is possible to particularly rapidly read out all sensor pixels 15 lying within a square or rectangular trigger subfield 20 of the sensor field 14, in particular much faster and within much shorter intervals than the entirety of the sensor pixels 15 of the sensor field 14.

Moreover, the camera 13 comprises a camera control 21 connected to the address generator 18 and the read-out register 19 and having an interface for exchanging data with the computer 2.

Figure 3:
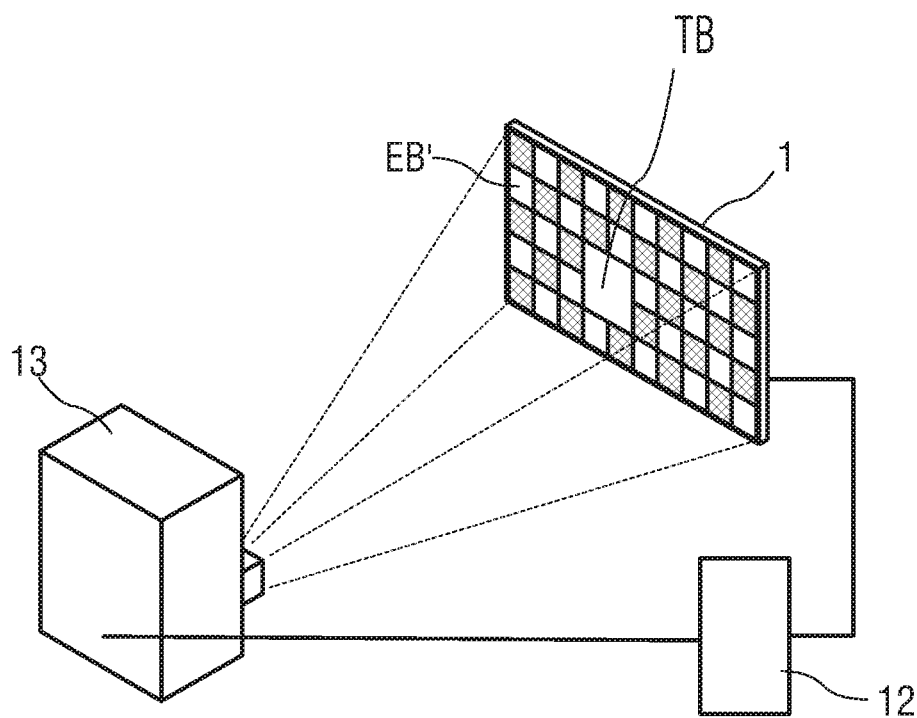
FIG. 3 is a schematic view of an arrangement for charting the burn-in behavior of a display.

The following is a description of the operation of the camera 13 shown in FIG. 3 according to the invention.

A camera image KB is transferred to the computer 2 as the entirety of all digitalized pixel values of the sensor pixels 15 of the sensor field 14. In the computer 2, a partial area of pixels of the camera image KB covering the trigger image are TB of the burn-in image EB' presented on the display 1 is identified. In an embodiment, a rectangular or square partial area of the camera image KB covering an area of the trigger image area TB which is a large as possible is determined.

This partial area may be determined by automatic image processing. Determination of the partial area in the camera image KB may also be carried out by manual tagging, wherein the camera image KB is presented on a display device not shown in detail and a rectangle or square inscribed in the trigger image area TB is selected, e.g. by means a pointing device.

By transferring the coordinates of pixels of the camera image KB to row addresses and column addresses of sensor pixels 15 of the sensor field 14, the address range of the trigger subfield 20 may be determined and transmitted to the camera control 21 based on the indication of the partial area in the camera image KB. For example, the indices of the first and the last column and of the first and the last row of the sensor field 14 delimiting the trigger subfield 20 may be transmitted.

The camera control 21 is configured and programmed such that the digitalized pixel values of the trigger subfield 20 are continuously read out and that, based on them, a respective trigger parameter T is determined from the pixel values of the trigger subfield 20. For example, the sum or the average of the pixel values of the trigger subfield 20 may be determined as a trigger parameter T.

Due to the very small trigger subfield 20 compared to the sensor field 14, the trigger parameter T may be determined at very short intervals.

Figure 5:
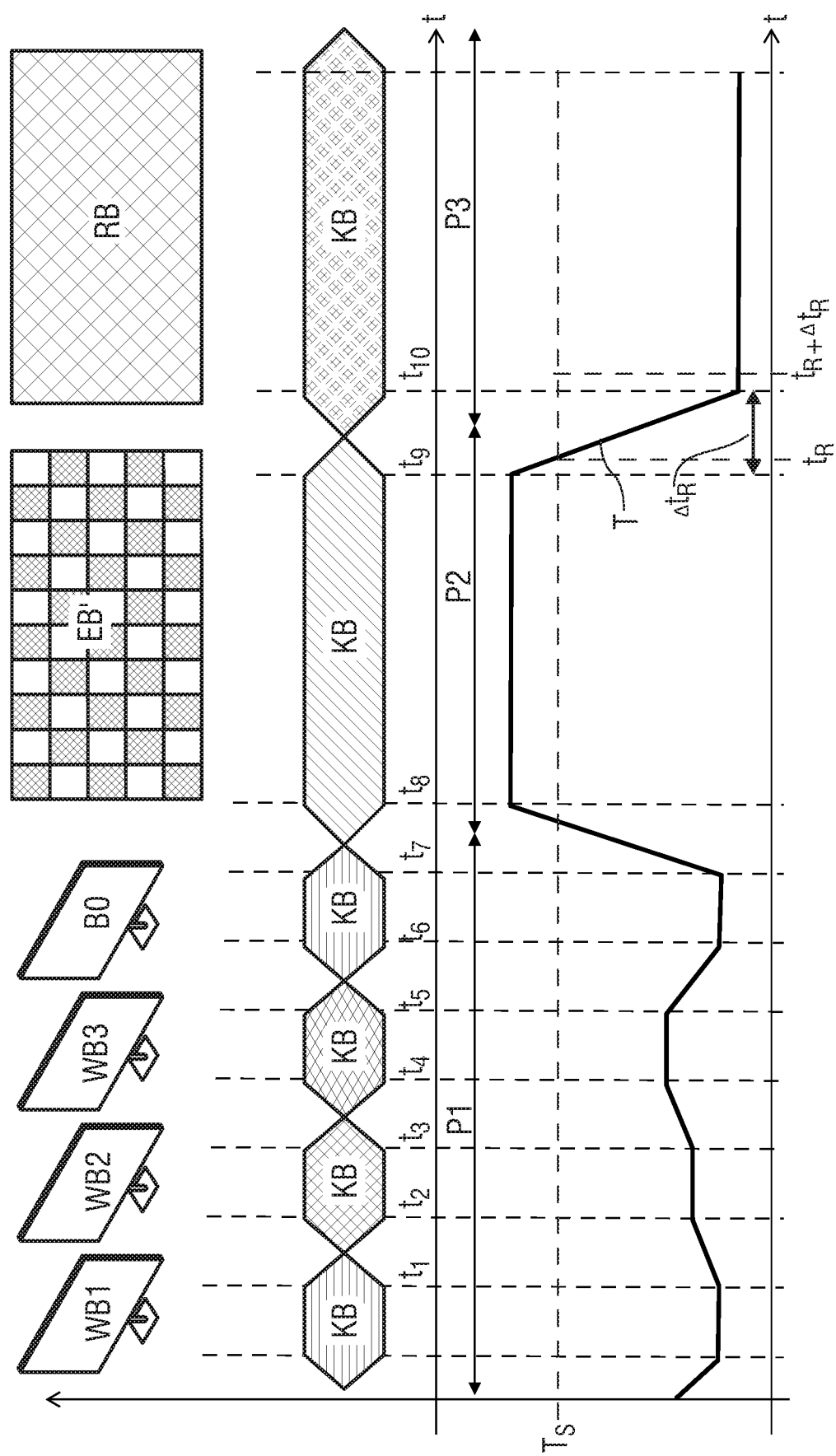
FIG. 5 is a schematic view of a course of trigger integral value corresponding to a trigger image area.

FIG. 5 shows the course of the trigger parameter T determined this way over the time axis t. As the trigger subfield 20 is adapted to the trigger image area TB of the display image DB presented on the display 1, the course of the trigger parameter T over time has particularly high values when the burn-in image EB' with the superposed trigger image area TB is presented with a particularly high (bright) grey scale value on the display 1.

This way it is possible to more precisely determine the switchover time $t_{10}$, at which the display 1 switches over between the presentation of the burn-in image EB' and the presentation of the relaxation image RB. For example, a trigger integral threshold value $T_S$ may be determined based on the particularly high (bright) grey scale value presented in the trigger image area TB and based on the extension of the trigger image area TB as well as based on the exposure time during which the trigger image area TB is respectively exposed. If the trigger parameter T determined by the camera control 21 exceeds the trigger integral threshold value $T_S$, then this exceedance indicates that the camera 13 has recorded the burn-in image EB'.

Accordingly, the subsequent first instance where the trigger parameter T falls below the trigger integral threshold value $T_S$ at the point in time $t_R$ indicates that the relaxation image RB is presented by the display 1 and that the same is recorded by the camera 13. This point in time may be recorded as the start of relaxation $t_R$, at which the relaxation of the display 1 starts and to which the temporally decreasing deviation of the camera image KB(RB) recorded during the third phase P3 (relaxation phase) compared to the camera image KB(B0) recorded at the end of the first phase P1 (warming-up phase) is to be related.

The recordation of the camera image KB(RB) which records a relaxation image RB presented on the display 1 after the start of relaxation $t_R$ is released by a trigger signal. The trigger signal may be generated immediately at the determined start of relaxation $t_R$. In an embodiment, the trigger signal is generated after a predetermined delay or waiting time $\Delta t_R$, i.e. at the point in time $t_R + \Delta t_R$, wherein this delay is chosen depending on the switchover time interval $[t_9, t_{10}]$ which is known or being determined for the display device, as will be described in even more detail in the following.

An advantage of the method according to the invention is therefore, that the accuracy in determining the start of the relaxation of the display 1 is basically only limited by the accuracy in determining the trigger integral threshold value $T_S$ and by the time period during which the camera 13 can respectively read out and sum up all sensor pixels 15 within the trigger subfield 20.

As opposed to the prior art, latencies and jitter do not play any role when transferring a display image DB from the computer 2 to the display 1. Furthermore, the latency of the display 1 does not or only marginally affect the accuracy in determining the start of relaxation.

The more precise determination of the start of relaxation $t_R$ also allows for a more precise determination of the burn-in effect compared to methods known in the art. For example, a relaxation time constant r may be determined more reliably and with higher precision.

In an embodiment, the determination of the trigger parameter T may be carried out only in a time interval around the control time $t_9$ while the computer 2 transmits the relaxation image RB to the display 1 after the burn-in image EB'. This time interval may be coarsely narrowed down, e.g. to a few tenths of a second. For example, the computer 2 may be programmed such that, immediately prior to the switchover of the display image DB from the burn-in image EB' to the relaxation image RB, a signal is transmitted to the camera control 21 which triggers the determination of the trigger parameter T for a predetermined time period, e.g. 500 milliseconds.

The camera control 21 may also be configured such that the exposure of the camera image KB(RB) related to the relaxation image RB starts after a predetermined waiting time $\Delta t_R$ beginning at the start of relaxation $t_R$ has elapsed. The predetermined waiting time $\Delta t_R$ may for example be entered at the computer 2 by the user and submitted by the computer 2 to the camera control 21.

It is possible to set the predetermined waiting time $\Delta t_R$ such that the switchover process of the display 1 from the presentation of the burn-in image EB' to the presentation of the relaxation image RB is safely completed when the camera image KB(RB) related to the relaxation image RB is being exposed. In an embodiment, the waiting time $\Delta t_R$ is set to be equal to or slightly greater than the switchover time interval $[t_9, t_{10}]$. $[t_9, t_{10}]$ indicates the period in which the image pixels of the presented image are safely switched over from the burn-in image EB to the relaxation image RB.

This way it is avoided to record a camera image KB at a time at which the display device 1 still partially presents the burn-in image EB, in particular in image areas outside the trigger image area TB, so that the burn-in effect would be overestimated. This way, the reliability in the assessment of the relaxation behavior of the display 1 is improved.

It is also possible to set the predetermined waiting time $\Delta t_R$ depending on criteria characterizing specific requirements when using the display 1 and/or which may be required by test standards.

In an embodiment, the burn-in behavior of the display 1, e.g. the relaxation time constant τ, may be determined based on a partial area of the camera image KB(RB) recorded corresponding to the relaxation image RB. For example, the burn-in behavior may be determined by analyzing only those image pixels of the camera image KB(RB) which are provided by the sensor pixels 15 within the trigger subfield 20, wherein the burn-in image EB' and the relaxation image RB are selected such that the sum or the average of the image pixels respectively assigned to the trigger image area TB differ between the burn-in image EB' and the relaxation image RB.

Likewise, in order to determine the burn-in behavior, it is possible to read out a sensor pixel 15 or several sensor pixels 15 of the camera image KB(RB) recorded of the relaxation image not or only partially lying within the trigger subfield 20 and to compare it/them with the camera image KB(EB) of the burn-in image EB.

For example, the burn-in image EB' may comprise a chessboard pattern with dark (black) and bright (white) fields, wherein one or more bright (white) fields of the chessboard pattern are assigned to the trigger image area TB. Herein, the reference image B0 is chosen to be homogenous with an average (grey) greyscale image value.

The burn-in behavior is then determined by analyzing the sensor pixels 15 which are located within the trigger subfield 14 or within another subfield of the sensor field 14 and on which the selected white field/fields are mapped during the burn-in (second phase P2) and then, during the relaxation (third phase P3), the average greyscale values interfered by the burn-in. It is likewise possible to assign selected dark (black) fields of the chessboard pattern to the trigger image area TB instead of the selected bright (white) fields of the chessboard pattern.

An advantage of this embodiment is that the possibility of faster determination whether the trigger parameter T determined over the trigger image area TB crosses (i.e. exceeds or falls below) the trigger threshold value $T_S$. This way, a higher temporal resolution is achieved when determining the point in time at which the trigger parameter T crosses the trigger threshold value $T_S$. The start of relaxation $t_R$ may thus be determined more precisely and the burn-in behavior of the display 1 may be determined more precisely.

Moreover, by reading out only a subfield of the sensor field 14 during relaxation (third phase P3), a read out clock rate, which is higher than the camera clock rate envisaged for completely reading out all sensor pixels 15 of the camera 13, is achieved. This way, the temporal course of the greyscale values presented by the display 1 and potentially interfered by the burn-in may be recorded during the relaxation with a higher temporal resolution and the burn-in behavior of the display 1 may be determined more precisely on this basis.

It is possible but not necessary that the subfield of the sensor field 14 read out during the relaxation is chosen to be identical or overlapping with the trigger subfield 20 which is analyzed for continuous determination of the trigger parameter T and for determining the start of relaxation $t_R$. Likewise, it is possible but not necessary that the subfield read out during the relaxation is chosen to be contiguous. The subfield is chosen such that it may be read out with a read out clock rate which is increased relative to the camera clock rate. This results in the advantage of a higher temporal resolution when determining the relaxation behavior and thus when assessing the burn-in behavior for the display 1.

In an alternative embodiment, the analysis of the image pixels of the camera image KB may also be carried out on the computer 2, wherein the camera control 21 is configured such that the camera image KB or the part of the camera image KB corresponding to the trigger image area TB is transmitted to the computer 2. The advantage of this embodiment is that the analysis of the camera image KB may be implemented independent from the camera 13 actually applied and that therefore different types of cameras 13 may be flexibly applied.

In contrast, the embodiment in which the [analysis of the] sensor values of the sensor field 14 and/or the trigger subfield 20 is carried out by the camera control 21 has the advantage that less data have to be transmitted between the camera 13 and the computer 2. This allows for lower latency and lower jitter between the control time $t_9$ of the switchover to the relaxation image RB and the determined start of relaxation $t_R$.

LIST OF REFERENCES 1 display, display device
2, 12 computer, control unit
3, 13 camera
14 sensor field
15 sensor pixel
16 column address decoder
17 row address decoder
18 address generator
19 read-out register
20 trigger subfield
21 camera control
B0 reference image
P1 first phase, warm-up phase
P2 second phase, burn-in phase
P3 third phase,
DB display image
EB, EB' burn-in image
KB camera image
RB relaxation image
TB trigger image area
T trigger parameter
t time axis
$t_1$, $t_3$, $t_5$, $t_7$, $t_9$ control time
$t_2$, $t_4$, $t_6$, $t_8$, $t_{10}$ switchover time
$t_R$ start of relaxation, point in time
$\Delta t_R$ waiting time
WB1, WB2, WB3 first to third warming-up image

What is claimed is:

1. A method for determining a start of relaxation when switching over an optical display device controllable pixel by pixel from a burn-in image to a relaxation image, wherein
    a trigger image area within the burn-in image and comprising at least one image pixel is set to pixel values such that a first parameter formed from the at least one pixel value in the trigger image area of the burn-in image differs from a second parameter formed from the at least one pixel value in the trigger image area of the relaxation image,
    the local distribution of a greyscale value corresponding to the local distribution of a photometric characteristic across the display device is continuously recorded by means of a camera comprising a sensor field of sensor pixels, wherein
        a trigger subfield comprising at least one sensor pixel is defined overlapping to the trigger image area of a display image presented on the display device, and
        a trigger parameter is continuously determined from the pixel values of the at least one sensor pixel in the trigger subfield with a trigger clock rate, and
    a trigger threshold value, which lies between the trigger parameter resulting for the recording of the burn-in image and the trigger parameter resulting for the recording of the relaxation image, is determined, and the start of relaxation is determined as the point in time at which the continuously determined trigger parameter crosses the trigger threshold value, wherein the trigger clock rate is chosen to be at least as high as the camera clock rate envisaged for reading out the sensor pixels of the sensor field.

2. The method according to claim 1, wherein the trigger parameter is only recorded in a period having a predetermined duration, comprising the point in time at which the display device is controlled to switch over from the burn-in image to the relaxation image.

3. The method according to claim 2, wherein a floating average is determined from a plurality of consecutive determined trigger parameters and compared with the trigger threshold value.

4. The method according to claim 1, wherein the pixel values in the trigger image area are selected such that a first average of pixel values in the trigger image area of the burn-in image is greater than a second average of pixel values in the trigger image area of the relaxation image.

5. The method according to claim 4, wherein the pixel values in the trigger image area are selected such that the maximum luminance density achievable with the display device is achieved in at least one subarea of the trigger image area of the burn-in image.

6. A method for determining the burn-in behavior of an optical display device controllable pixel by pixel, wherein
the display device is controlled to present a reference image if it has not been subjected to a burn-in process, wherein
a first camera image covering the local distribution of a greyscale value corresponding to the local distribution of a photometric characteristic across the display device is recorded by a camera while the same is controlled to present the reference image,
the display device is controlled to present the burn-in image for a predetermined burn-in period,
the display device is controlled to present the relaxation image, wherein
at least one further camera image covering the local distribution of a greyscale value corresponding to the local distribution of a photometric characteristic across the display device is recorded by the camera while the same is controlled to present the relaxation image, and
a start of relaxation is determined by means of the camera according to the method of claim 1, and
the burn-in behavior for the display device is determined from the first camera image, the at least one further camera image and the start of relaxation.

7. The method according to claim 6, wherein a subfield of the sensor field is being read out from the at least one further camera image covering the local distribution of a greyscale value corresponding to the local distribution of a photometric characteristic across the display device while the same is controlled to present the relaxation image, the reading out being performed using a read out clock rate which is higher than the camera clock rate envisaged for the complete reading out of the sensor field.

8. The method according to claim 7, wherein the subfield read out using the read out clock rate at least partially overlaps the trigger subfield.

9. The method according to claim 6, wherein the camera is configured as a luminance density measurement camera.

10. The method according to claim 6, wherein the at least one further camera image is recorded within a predetermined temporal offset to the determined start of relaxation.

11. A device, comprising a control unit and a camera, wherein the control unit is configured for controlling an optical display device controllable pixel by pixel, wherein the control unit and the camera are configured to perform the method according to claim 6, and wherein the camera is configured as a complementary metal-oxide semiconductor (CMOS) camera or as a charged coupled device (CCD) camera.

12. The device according to claim 11, wherein the camera is configured for continuously determining the trigger characteristic from the at least one pixel value of the sensor pixels in the trigger subfield and for comparing the trigger characteristic with the trigger threshold value.

13. A device, comprising a control unit and a camera, wherein the control unit is configured for controlling an optical display device controllable pixel by pixel, wherein the control unit and the camera are configured to perform the method according to claim 6, and wherein the camera is configured as a complementary metal-oxide semiconductor (CMOS) camera or as a charged coupled device (CCD) camera.

14. The device of claim 13, wherein the camera is configured for continuously determining the trigger characteristic from the at least one pixel value of the sensor pixels in the trigger subfield and for comparing the trigger characteristic with the trigger threshold value.

15. The method according to claim 6, wherein the burn-in behavior of a display is determined for application in a vehicle.

* * * * *